US012259557B2

(12) United States Patent
Nakahara et al.

(10) Patent No.: US 12,259,557 B2
(45) Date of Patent: Mar. 25, 2025

(54) OPTICALLY POWERED LENS ASSEMBLY FOR HEAD-MOUNTED DEVICES

(71) Applicant: Meta Platforms Technologies, LLC, Menlo Park, CA (US)

(72) Inventors: Sho Nakahara, Bothell, WA (US); Garret Odom, Tucson, AZ (US); Carl Chancy, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/237,753

(22) Filed: Aug. 24, 2023

(65) Prior Publication Data

US 2024/0094533 A1 Mar. 21, 2024

Related U.S. Application Data

(60) Provisional application No. 63/408,447, filed on Sep. 20, 2022.

(51) Int. Cl.
*G02B 27/01* (2006.01)
*G02B 1/10* (2015.01)
(Continued)

(52) U.S. Cl.
CPC ........... *G02B 27/0172* (2013.01); *G02B 1/10* (2013.01); *G02B 3/0087* (2013.01); *G02B 3/08* (2013.01);
(Continued)

(58) Field of Classification Search
CPC .............................. G02B 3/0087; G02B 3/08; G02B 2027/0178; G02B 27/0172; G02B 1/10;
(Continued)

(56) References Cited

U.S. PATENT DOCUMENTS 7,102,820 B2 * 9/2006 Peterson ................ G03B 21/06
359/449
8,384,999 B1 * 2/2013 Crosby .............. G02B 27/0172
359/410
(Continued)

FOREIGN PATENT DOCUMENTS

DE  102018107113 A1  9/2019
EP     4292798 A1 * 12/2023 ....... B29D 11/00028

OTHER PUBLICATIONS

European Search Report for European Patent Application No. 23198238.0, dated Feb. 9, 2024, 4 pages.

*Primary Examiner* — Ricardo Osorio
(74) *Attorney, Agent, or Firm* — Freestone Intellectual Property Law PLLC; Aaron J. Visbeek

(57) ABSTRACT

An apparatus, system, and method for a lens assembly for a head-mounted device includes a frame and a lens assembly. The lens assembly is configured to be carried by the frame. The lens assembly includes a lens bulk, an edge thickness, and a power layer. The edge thickness includes a predetermined thickness value that is configured to be compatible with (e.g., a slot in) the frame. The power layer is configured to be set to one of a number of predetermined power levels while maintaining the edge thickness within the predetermined thickness value. The power layer is configured to define a course power level of the lens assembly (e.g., in the range of −6.00 D to +6.00 D).

20 Claims, 7 Drawing Sheets

(51) Int. Cl.
*G02B 3/00* (2006.01)
*G02B 3/08* (2006.01)
*G02B 27/00* (2006.01)

(52) U.S. Cl.
CPC .. *G02B 27/0093* (2013.01); *G02B 2027/0178* (2013.01)

(58) Field of Classification Search
CPC .......... G02B 27/0093; G02B 2027/015; G02B 27/0176; G02C 2202/12; G02C 2202/16; G02C 2202/20; G02C 7/086
See application file for complete search history.

(56) References Cited

U.S. PATENT DOCUMENTS

| | | | |
|---|---|---|---|
| 9,810,904 B1* | 11/2017 | Bierhuizen | G02B 27/0172 |
| 10,747,009 B1* | 8/2020 | Sharma | B29D 11/00865 |
| 11,092,874 B1* | 8/2021 | Zhang | G02F 1/3544 |
| 11,867,973 B2* | 1/2024 | Landig | G02B 3/14 |
| 2016/0025978 A1 | 1/2016 | Mallinson | |
| 2016/0198949 A1* | 7/2016 | Spitzer | A61B 3/111 |
| | | | 351/204 |
| 2017/0123207 A1* | 5/2017 | Kress | G02B 27/0172 |
| 2017/0123526 A1* | 5/2017 | Trail | G06V 40/19 |
| 2019/0129174 A1* | 5/2019 | Perreault | G06F 3/013 |
| 2021/0080721 A1 | 3/2021 | Geng et al. | |
| 2022/0350051 A1* | 11/2022 | Nakahara | B29D 11/0073 |
| 2023/0094153 A1* | 3/2023 | Almanza-Workman | |
| | | | G02C 7/027 |
| | | | 351/159.74 |

\* cited by examiner

| Lens Puck | Added Power (D) | Rx Range Incuding Cylinder | Final Rx Range Including Cylinder | Final Edge Thickness |
|---|---|---|---|---|
| 0 D Puck | 0 | 0 - -2.00 | 0 - -2.00 | 2-3 mm |
| 2 D Puck | -2.00 | 0 - -2.00 | -2.00 - -4.00 | 2-3 mm |
| 4 D Puck | -4.00 | 0 - -2.00 | -4.00 - -6.00 | 2-3 mm |
| 6 D Puck | -6.00 | 0 - -2.00 | -6.00 - -8.00 | 2-3 mm |

| Lens Bulk | Rx adding power (D) | Final Rx range (D) | Final Cyl range (D) | Thickness |
|---|---|---|---|---|
| -2.00D | +2.0 - -1.0 | 0 - -3.00 | 0-2.00 | 2-3 mm |
| -4.00D | +1.75 - -1.0 | -3.25 - -5.00 | 0-2.00 | 2-3 mm |
| -6.00D | +1.75 - -1.0 | -5.25 - -7.00 | 0-2.00 | 2-3 mm |

OPTICALLY POWERED LENS ASSEMBLY FOR HEAD-MOUNTED DEVICES

CROSS-REFERENCE TO RELATED APPLICATIONS

This application claims priority to U.S. provisional Application No. 63/408,447 filed Sep. 20, 2022, which is hereby incorporated by reference.

TECHNICAL FIELD

This disclosure generally relates to optics, and in particular to augmented reality (AR) and virtual reality (VR) lens assemblies.

BACKGROUND INFORMATION

Augmented reality (AR) and virtual reality (VR) headsets provide interactive and immersive experiences for users. AR and VR headsets can be easy to use for users who do not require corrected vision, but near-sighted and far-sighted users may experience challenges in focusing on the various user experience (UX) elements provided by the AR or VR headsets.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 5 illustrates a diagram of a chart of various lens assembly optical power options, in accordance with aspects of the disclosure.

FIG. 6 illustrates a diagram of a chart of various lens assembly optical power options, in accordance with aspects of the disclosure.

DETAILED DESCRIPTION

Figure 1:
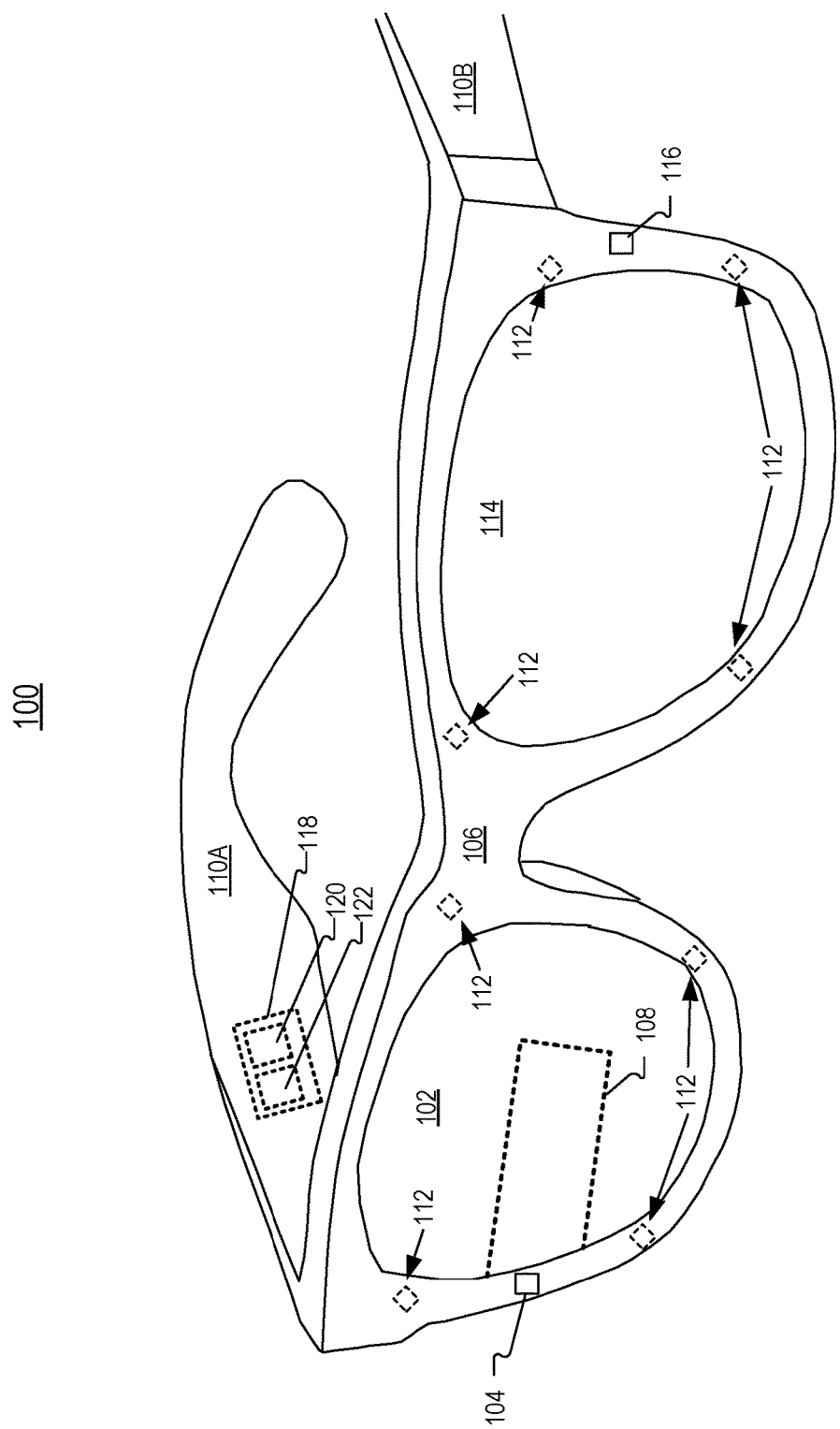
FIG. 1 illustrates a head-mounted device, in accordance with aspects of the disclosure.

Embodiments of an optically powered lens assembly for head-mounted devices are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 µm.

In aspects of this disclosure, the term "transparent" may be defined as having greater than 90% transmission of light. In some aspects, the term "transparent" may be defined as a material having greater than 90% transmission of visible light.

In ophthalmic lens glasses (i.e., prescription eyeglasses), the lens edge thickness increases with increases in power. For example, a lens having a power of −2.00 diopters (D) may have the edge thickness that is about 2-3 mm. For a lens having a power of −4.00 D, the edge thickness for the lens can be above 4 mm due to an increased radius curvature. In typical eyeglasses, the edge thickness can be aesthetically unpleasing but otherwise not impact the function of the lens or glasses. In current eyeglass manufacturing, different prescription (Rx) ranges will sometimes use various (e.g., high refractive index and low refractive index) materials to cover different prescription ranges, but this can result in larger variations in edge thicknesses of lenses. Due to the complexity of the frame of artificial reality (AR) glasses, the lens edge thickness specification or requirements/specifications can be much tighter than classic ophthalmic lens. According to various aspects of the disclosure, different power levels of lenses may be provided with an edge thickness variation that is within a relatively narrow and predetermined range (e.g., 2-3 mm) to support custom prescriptions in AR glasses.

AR lenses have a higher complexity and sophistication than classic ophthalmic lenses. For example, AR glasses may include a number of electronic and display features added into the lenses. As a result, developing AR glasses with both various prescription ranges and precisely controlled edge thickness can be a challenge. To achieve a lens edge thickness in a certain range (e.g., 2-3 mm) that covers the Rx power range of +8.00 D to −8.00 D (including cylinder), embodiments of the disclosure include a new lens bulk. The lens bulk includes a pre-added optical power feature or layer configured to compensate for the edge variation of different prescriptions. This pre-added optical power may be referred to as a (hidden) power layer added to the lens bulk to enable the bulk to be processed in a tight edge thickness range to cover a large Rx range for AR and/or virtual reality (VR) glasses.

The power layer may be added to a lens bulk using a variety of techniques. In an embodiment, the power layer includes a Fresnel structure developed in a semi-finished bulk. The Fresnel structure may add a predetermined amount of power to the semi-finished bulk, which may be further adjusted through Rx surfacing or 3D printing. As used herein, Rx surfacing or prescription surfacing includes removal of lens material from, for example, an eye side of a lens to modify (e.g., reduce or increase) the optical power of the lens. The Fresnel structure may be covered with a layer of fill (or coating) that is planar or convex, according to embodiments. The backside or eye side surface of the lens may be Rx surfaced to add (or subtract) cylinder or spherical power. In an embodiment, the power layer includes a gradient index (GRIN) structure. The GRIN structure may add a predetermined amount of power to the semi-finished bulk, which may be further adjusted through Rx surfacing or 3D printing. The GRIN structure may be coupled to the lens bulk using, for example, adhesive or heat. Various techniques may be used to fabricate, couple, or adhere power structures within the power layer, in accordance with aspects of the disclosure.

The disclosed power layer in a lens bulk may allow for a predetermined edge thickness of lenses to provide customized optical prescriptions for AR and VR glasses. Varying optical powers with a predetermined edge thickness may enable many users having different eyeglass prescriptions to have a similarly enjoyable or productive experience with AR or VR glasses. The disclosed lenses with a predetermined edge thickness for customized optical prescription may assist in personalizing and improving user experiences (UX) for a head-mounted display (HMD) for virtual reality (VR), augmented reality (AR), mixed reality (MR), or other head-mounted devices (e.g., smart glasses), in accordance with various aspects of the disclosure.

FIG. 1 illustrates an example head-mounted display (HMD) 100 configured to support customized optical prescriptions having lenses with a predetermined edge thickness, in accordance with aspects of the disclosure. HMD 100 includes a lens assembly 102 that has a predetermined edge thickness, according to an embodiment of the disclosure. An HMD, such as HMD 100, is one type of head-mounted device, typically worn on the head of a user to provide AR content to the user. AR is a form of reality that has been adjusted in some manner before presentation to the user. HMD 100 may additionally or alternatively be configured to provide virtual reality (VR), augmented reality (AR), mixed reality (MR), hybrid reality, or some combination and/or derivative thereof.

HMD 100 may carry lens assembly 102 with a frame 106. Frame 106 may be configured to receive lenses with a particular edge thickness to support various prescriptions. For example, frame 106 may have grooves or cutouts that are configured to receive a lens having a particular predetermined edge thickness, according to an embodiment. Frame 106 may include or be coupled to arms 110A and 110B. Lens assembly 102 may be mounted to, inserted into, or otherwise carried by frame 106. The illustrated HMD 100 is configured to be worn on or about a head of a wearer of HMD 100.

Lens assembly 102 may appear transparent to a user to facilitate AR or MR and to enable a user to view scene light from the environment around her while also receiving image light directed to her eye(s). Consequently, lens assembly 102 may be considered (or include) an optical combiner. Lens assembly 102 may include two or more optical layers. One optical layer may be a lens bulk layer, one optical layer may be a power layer, and another optical layer may include a display layer having one or more integrated displays that is configured to provide user experience (UX) information to the eyebox region, in an embodiment. In some embodiments, display light from one or more integrated displays is directed into one or both eyes of the wearer of HMD 100.

To support eye tracking and other user interface features, HMD 100 may include an image sensor 104, a number of light sources 112, and a controller 118, according to an embodiment. Image sensor 104 may be configured to capture reflections from an eye or eyebox region of HMD 100 to support eye tracking functionality. Light sources 112 may be positioned at one or more locations around frame 106. Light sources 112 may be oriented to direct light towards the eyebox region, to illuminate at least one user's eye. Light sources 112 may emit light that is in the non-visible spectrum. For example, light sources 112 are configured to emit infrared light, for example, having a wavelength in the range of 750 nm to 1500 nm, according to an embodiment. Light sources 112 may be light emitting diodes (LEDs), vertical-cavity surface-emitting lasers (VCSELs), micro light emitting diode (micro-LED), an edge emitting LED, a superluminescent diode (SLED), or another type of light source.

HMD 100 includes a controller 118 communicatively coupled to image sensor 104, according to an embodiment. Controller 118 is coupled to image sensor 104 to receive images captured by image sensor 104 using, for example, a (display) waveguide 108 that is integrated into lens assembly 102, according to an embodiment. Controller 118 may include processing logic 120 and one or more memories 122 to analyze image data received from image sensor 104, to determine an orientation of one or more of a user's eyes, to perform one or more eye tracking operations, and/or to display or provide user interface elements in lens assembly 102, according to an embodiment. Controller 118 may include a wired and/or wireless data interface for sending and receiving data and graphic processors, and one or more memories 122 for storing data and computer-executable instructions. Controller 118 and/or processing logic 120 may include circuitry, logic, instructions stored in a machine-readable storage medium, ASIC circuitry, FPGA circuitry, and/or one or more processors. In one embodiment, HMD 100 may be configured to receive wired power. In one embodiment, HMD 100 is configured to be powered by one or more batteries. In one embodiment, HMD 100 may be configured to receive wired data including video data via a wired communication channel. In one embodiment, HMD 100 is configured to receive wireless data including video data via a wireless communication channel.

HMD 100 may include a lens assembly 114 and an image sensor 116 positioned on, for example, a left side of frame 106. Lens assembly 114 may include similar features as lens assembly 102, according to an embodiment. Image sensor 116 may be configured to operate similarly to image sensor 104 and may also be coupled to controller 118 to provide scene facing or eye facing image data, according to an embodiment.

Figure 2:
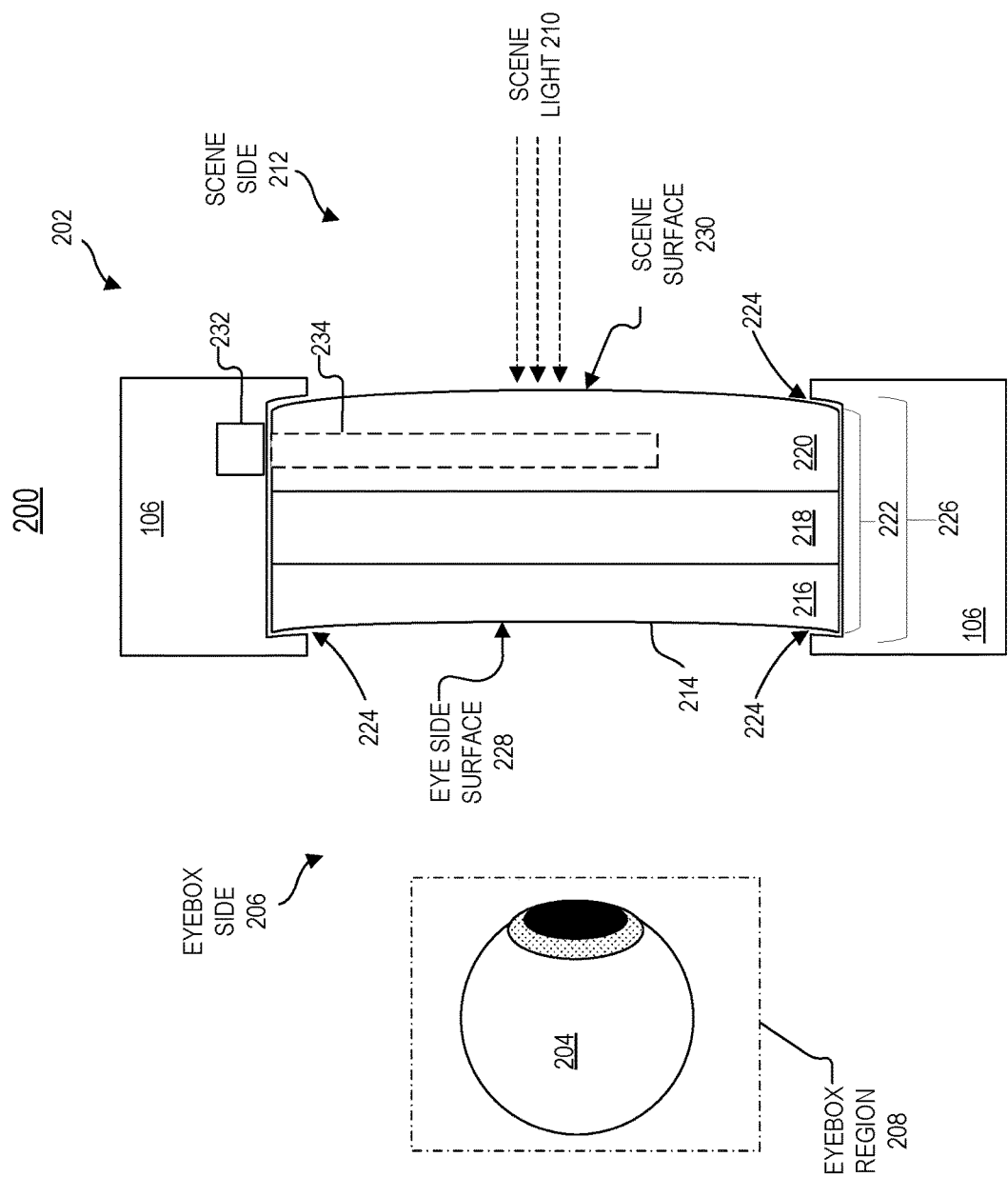
FIG. 2 illustrates an example implementation of a lens assembly for a head-mounted device, in accordance with aspects of the disclosure.

FIG. 2 illustrates an example side view of an ocular environment 200, in accordance with various embodiments of the disclosure. Ocular environment 200 includes an HMD 202 and an eye 204, according to an embodiment. HMD 202 is an example implementation of HMD 100. As illustrated, HMD 202 is a partial cross-sectional side view of aspects of a head-mounted device, according to an embodiment. Eye 204 is positioned on an eyebox side 206 of HMD 202. Eye 204 is positioned in an eyebox region 208 on eyebox side 206 and is positioned to receive scene light 210 from a scene side 212. Scene light 210 passes through a lens assembly 214 to eyebox region 208 and to eye 204 (or eyebox region

208), according to an embodiment. Scene light 210 passes from scene side 212 through lens assembly 214 to eyebox side 206.

Lens assembly 214 is an example implementation of lens assembly 102 (shown in FIG. 1), according to aspects of the disclosure. Lens assembly 214 may include a lens bulk 216, a power layer 218, and a display layer 220. Power layer 218 may be part of lens bulk 216, or power layer 218 may be coupled or adhered to lens bulk 216, according to an embodiment. Lens assembly 214 may be configured to have (with the multiple layers) an edge thickness 222 that is predetermined. Predetermined edge thickness 222 may be 2 mm to 3 mm or may be some other predetermined range of thicknesses, according to an embodiment. Predetermined edge thickness 222 may be in the range of 1 mm to 4 mm, according to an embodiment. Predetermined edge thickness 222 may have a tolerance of, for example, 1 mm and may be 1.5 mm to 2.5 mm, 2 mm to 3 mm, 2.5 mm to 3.5 mm, or 3 mm to 4 mm, for example.

Frame 106 may be configured to receive a lens assembly having a predetermined thickness. For example, frame 106 may be configured to receive lens assembly 214, and lens assembly 214 may be configured to have any one of a number of different prescription powers, for example, in the range of +8.00 D to −8.00 D. Frame 106 may have a slot 224 that has a width 226 that is configured to receive a particular range of lens edge thicknesses, according to an embodiment. Slot 224 may have a width 226 that is configured to receive a lens assembly having a thickness of 2 mm to 3 mm, according to an embodiment.

Lens bulk 216 may be a semi-finished lens puck that may be adjusted to provide customized prescription values in AR or VR glasses to improve the usability of AR/VR glasses, according to an embodiment. Lens bulk 216 may be planar on eyebox side 206. Lens bulk 216 may be prescription (Rx) surfaced on an eye side surface 228 to be concave to provide cylindrical or spherical power in the range of, for example +2.00 D to −2.00 D, according to an embodiment. In other words, Rx surfacing may be used to provide a fine adjustment of negative or positive optical power to lens bulk 216. Lens bulk 216 may include acrylic, polycarbonate, polyurethane, polyamine, or vinyl material. A scene side surface 230 of lens assembly 214 may be filled, 3D printed, cast, laminated, or otherwise built up with a convex surface to add power to lens assembly 214. Lens bulk 216 may include power layer 218, and display layer 220 may be omitted or relocated within lens assembly 214 (e.g., between lens bulk 216 and power layer 218), according to an embodiment.

Figure 3:
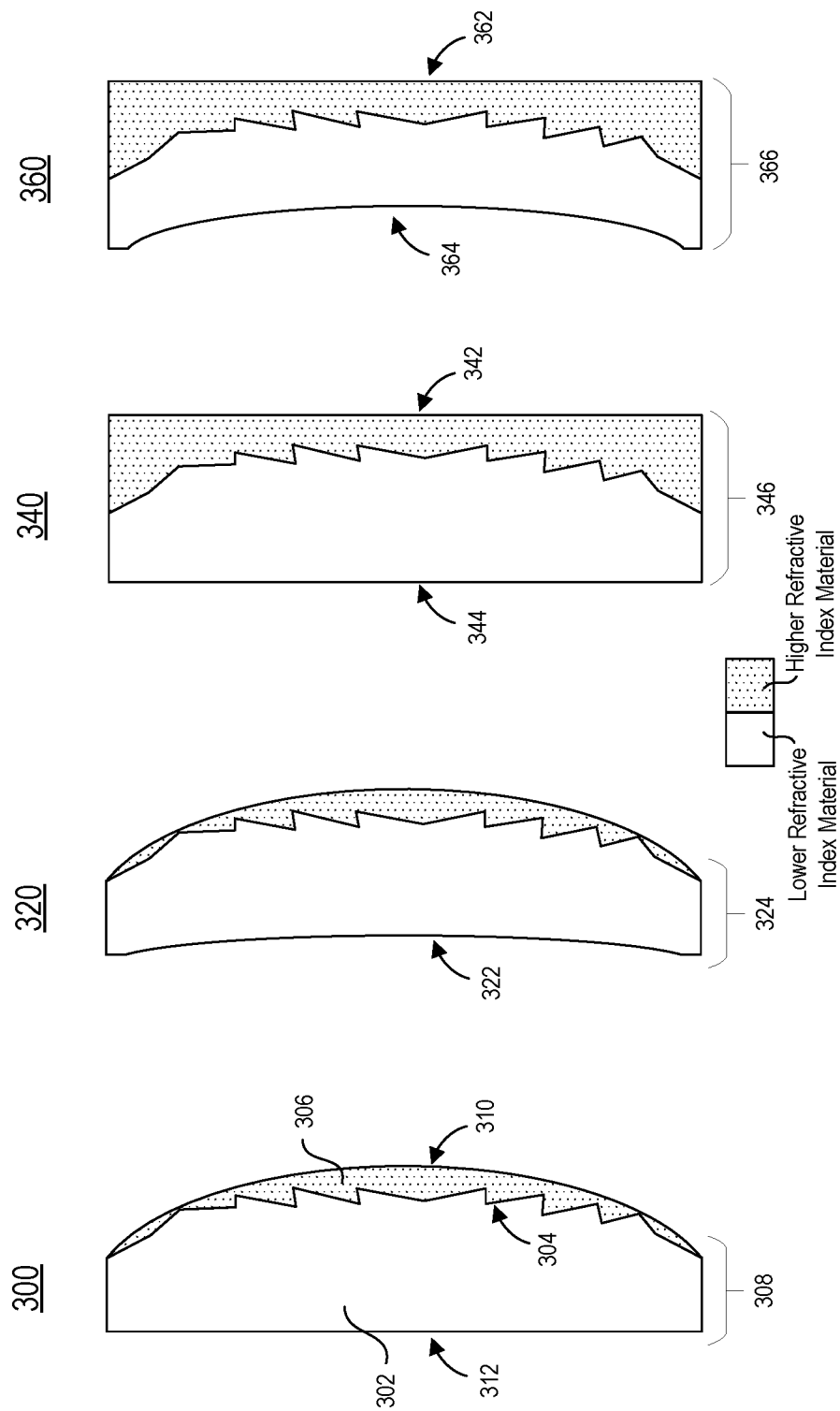
FIGS. 3A-3D illustrate example implementations of a lens assembly, in accordance with aspects of the disclosure.
Figure 4:
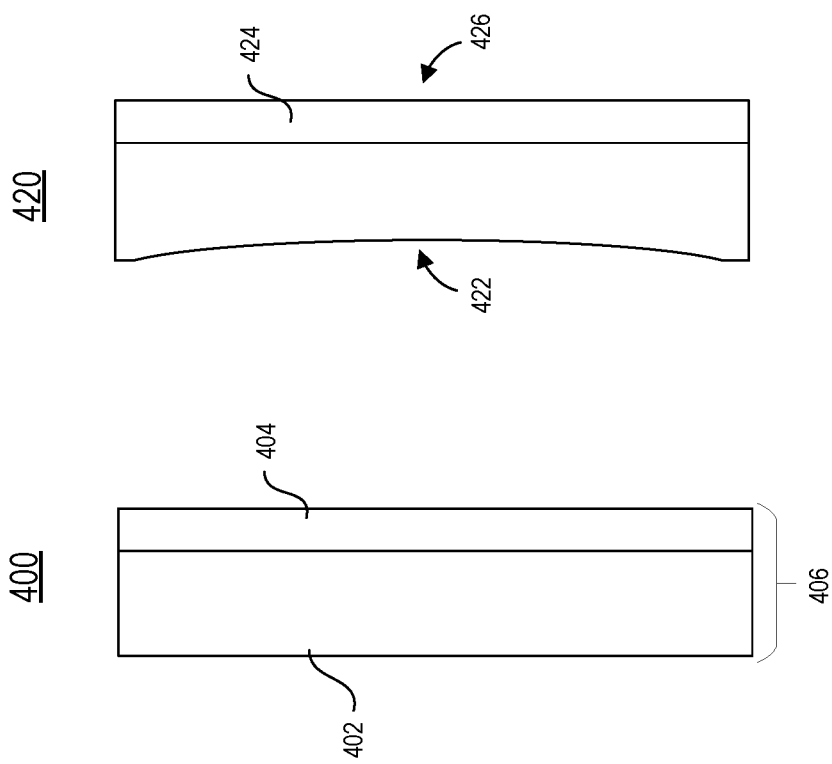
FIGS. 4A and 4B illustrate example implementations of a lens assembly, in accordance with aspects of the disclosure.

Power layer 218 may be a layer within lens assembly 214 that adds positive or negative optical power to lens bulk 216 or lens assembly 214, according to an embodiment. Power layer 218 may include a Fresnel structure or a GRIN structure to add positive or negative optical power to lens assembly 214. Power layer 218 may be etched into, adhered onto, or otherwise fabricated onto lens bulk 216, according to an embodiment. Power layer 218 may include a Fresnel structure with a convex, concave, or planar deposit that has been cast or 3D printed over the Fresnel structure (e.g., as shown in FIGS. 3 and 4), according to an embodiment.

HMD 202 and display layer 220 may include a projector 232 and a display 234 that are configured to provide information and/or user experience (UX) elements to eyebox region 208 for viewing by a user of HMD 202, according to an embodiment. Display 234 may include a liquid crystal display (LCD), an organic light emitting diode (OLED) display, a micro-LED display, a quantum dot display, a pico-projector, or a liquid crystal on silicon (LCOS) display for directing image light to a wearer of HMD 202. Projector 232 may be positioned in or on frame 106, and display 234 may be at least partially positioned within lens assembly 214, according to an embodiment. Display 234 may be transparent and may be configured to allow scene light 210 to pass through lens assembly 214 to eyebox region 208, according to an embodiment. Projector 232 and display 234 may be communicatively coupled to receive instructions and/or information from controller 118 (shown in FIG. 1) and may be configured to project information at least partially based on an orientation of eye 204, according to an embodiment.

FIGS. 3A-3D illustrate examples of side views of lens assemblies that may be configured to provide various negative optical powers to, for example, correct for myopia, while maintaining a predetermined range of lens edge thicknesses, in accordance with implementations of the disclosure. The lens assemblies of FIGS. 3A-3D are example implementations of lens assemblies 102 and 214.

FIG. 3A illustrates an example side view of a lens assembly 300 that is configured to provide various optical powers with a predetermined lens edge thickness, to support customized prescriptions in an HMD, in accordance with embodiments of the disclosure. Lens assembly 300 includes a lens bulk 302, a Fresnel structure 304, and a lens coating 306, according to an embodiment. Lens assembly 300 is configured to provide a corrective prescription for myopia and may include a power in the range of 0 D to −8.00 D, while having a predetermined edge thickness 308 that is compatible with specifications of a frame for AR or VR glasses, according to an embodiment. Lens assembly 300 is configured to diverge light rays entering a user's eye so that the light rays focus further back and land on the user's retina rather than in front of it. To provide a negative power, lens bulk 302 includes a material having a first refractive index and lens coating 306 includes a material having second refractive index. The first refractive index of lens bulk 302 is lower than the second refractive index of lens coating 306, according to an embodiment. For example, the first refractive index of lens bulk 302 may be 1.5 or less, and the second refractive index of lens coating 306 may be 1.7 or greater. Materials having other refractive indices may be used (e.g., having a refractive index of 2.0), but materials having a refractive index in the range of 1.3 to 1.8 may be more readily available and cost effective. The different refractive indices in combination with Fresnel structure 304 function together to provide a negative optical power from a scene side surface 310 to an eye side surface 312 to compensate for myopia, according to an embodiment.

Fresnel structure 304 may be varied to provide different power levels for lens assembly 300. For example, Fresnel structure 304 may be configured to cause lens assembly 300 to have a (course and predetermined) power level of 0.00 D, −2.00 D, −4.00 D, or −6.00 D, according to an embodiment. Fresnel structure 304 may be a concave Fresnel structure configured to operate like a concave lens, according to an embodiment. Fresnel structure 304 may have the Fresnel ridges directed towards scene side surface 310 (e.g., formed on scene side of lens bulk), which may facilitate Rx surfacing eye side surface 312. In an embodiment, Fresnel structure 304 may be a concave Fresnel structure configured to operate like a concave lens and may have Fresnel ridges that are directed towards eye side surface 312 to decrease an optical power of lens assembly 300 (e.g., formed on eye side of lens bulk), which may facilitate 3D printing on scene side surface 310. Eye side surface 312 may be planar (as shown) or may be Rx surfaced or 3D printed to provide additional (fine) spherical or cylindrical power in the range of, for example, +2.00 D to −2.00 D, in increments of +/−0.10 D or +/−0.25 D, according to various implementations of the disclosure.

Lens coating 306 may have characteristics that can be changed to further adjust the power of lens assembly 300, while maintaining predetermined edge thickness 308. For example, lens coating 306 may be made to be thicker or thinner in the middle to modify the radius of scene side surface 310 to change the power of lens assembly 300. Lens coating 306 may be 3D printed, molded, laminated, casted, or coated over Fresnel structure 304 to provide fine optical power adjustments, according to various embodiments.

FIG. 3B illustrates an example side view of a lens assembly 320 that is configured to provide various optical powers with a predetermined lens edge thickness, to support customized prescriptions in an HMD, in accordance with embodiments of the disclosure. Lens assembly 320 is similar to lens assembly 300. However, lens assembly includes an eye side surface 322 that has been Rx surfaced to be concave and that is configured to provide fine optical power adjustments. Rx surfacing may be used to add cylindrical or spherical power to lens assembly 320, while maintaining a predetermined edge thickness 324 of lens assembly 320, according to an embodiment. Rx surfacing of eye side surface 322 may be used to (positively or negatively) incrementally change the prescription of lens assembly by, for example, increments of +/−0.1 D to +/−0.25 D, or similar incremental values.

FIG. 3C illustrates an example side view of a lens assembly 340 that is configured to provide various optical powers with a predetermined lens edge thickness, to support customized prescriptions in an HMD, in accordance with embodiments of the disclosure. Lens assembly 340 is similar to lens assemblies 300 and 320 but is in a plano-plano configuration. In other words, lens assembly 340 may be configured to have a scene side surface 342 that is planar and may be configured to have an eye side surface 344 that is also planar, while maintaining a predetermined edge thickness 346, according to an embodiment.

FIG. 3D illustrates an example side view of a lens assembly 360 that is configured to provide various optical powers with a predetermined lens edge thickness, to support customized prescriptions in an HMD, in accordance with embodiments of the disclosure. Lens assembly 360 is similar to lens assemblies 300, 320, and 340. Lens assembly 360 may be configured to have a scene side surface 362 that is planar and may be configured to have an eye side surface 364 that is Rx surfaced to increase the (negative or positive) power of lens assembly 360, while maintaining a predetermined edge thickness 366, according to an embodiment.

FIGS. 4A-4B illustrate example side views of lens assemblies that may be configured to provide various optical powers to, for example, correct for myopia or hyperopia using a predetermined range of lens edge thicknesses, in accordance with implementations of the disclosure. The lens assemblies of FIGS. 4A-4B are example implementations of lens assemblies 102 and 214.

FIG. 4A illustrates an example side view of a lens assembly 400 that is configured to provide various optical powers with a predetermined lens edge thickness, to support customized prescriptions in an HMD, in accordance with embodiments of the disclosure. Lens assembly 400 includes a lens bulk 402 and a gradient index (GRIN) structure 404 to provide customized prescription powers while maintaining a predetermined edge thickness 406, according to an embodiment. Lens assembly 400 can be configured to provide negative optical power or positive optical power to, for example, compensate for hyperopia or myopia, according to various embodiments. Lens bulk 402 may be fabricated from a first material having a first refractive index, and GRIN structure 404 may be fabricated from a second material having a second refractive index. The first refractive index may be greater than the second refractive index, to correct for one type of ocular issue (e.g., myopia), or the first refractive index may be less than the second refractive index to correct for another type of ocular issue (e.g., hyperopia), according to an embodiment. GRIN structure 404 may be configured to provide a corrective prescription and may include a power in the range of −8.00 D to +8.00 D, while having a predetermined edge thickness 406 that is compatible with specifications of a frame for AR or VR glasses, according to an embodiment. GRIN structure may be adhered or coupled to lens bulk 402 using, for example, an adhesive or heat.

FIG. 4B illustrates an example of a lens assembly 420 that is configured to provide various optical powers with a predetermined lens edge thickness, to support customized prescriptions in an HMD, in accordance with embodiments of the disclosure. Lens assembly 420 is similar to lens assembly 400 but has an eye side surface 422 that is Rx surfaced to further refine or provide additional or less power than is provided by, for example, GRIN structure 424. For example, if GRIN structure 424 is configured to provide a +8.00 D optical power, eye side surface 422 may be Rx surfaced to reduce the optical power of lens assembly 420 by −1.50 D so the optical power of lens assembly 420 is +6.50 D from scene side surface 426 to eye side surface 422, according to an embodiment. As another example, if GRIN structure 424 is configured to provide a −4.00 D optical power, eye side surface 422 may be Rx surfaced to increase the optical power of lens assembly 420 by +0.25 D so the optical power of lens assembly 420 is −3.75 D from a scene side surface 426 to eye side surface 422, according to an embodiment. In one embodiment, eye side surface 422 or scene side surface 426 may be 3D printed, laminated, or molded over to add material and to add, for example, small amounts of positive optical power (e.g., +0.10 to +2.00). Although specific examples of Rx surfacing and 3D printing are provided, it is to be understood that Rx surfacing may be used to increase optical power or decrease optical power in a lens assembly. Additionally, it is to be understood that 3D printing may be used to increase optical power or decrease optical power, according to various embodiments of the disclosure.

FIG. 5 illustrate examples of charts of power level variations that may be fabricated with a predetermined edge thickness, in accordance with aspects of the disclosure. FIG. 5 illustrates a chart 500 that demonstrates power layers (e.g., in a lens assembly) that may be used to provide various negative optical powers, according to an embodiment. Lens bulks may be fabricated from a lens puck having a prefabricated power level. For example, a lens bulk may begin with a lens puck having an initial power level of 0 D, 2 D, 4 D, or 6 D, as an example, that may be configured to provide a power level of 0 D, −2.00 D, −4.00 D, or −6.00 D. These predetermined lens pucks may have power levels that are defined by, for example, a Fresnel structure or a GRIN structure, as disclosed herein. The lens pucks may then be Rx surfaced in a range of 0 to −2.00 D to provide final lens bulks with power levels in the range of 0 to −2.00 D, −2.00 to −4.00 D, −4.00 to −6.00 D, or −6.00 to −8.00 D. The lens bulks may have these various power levels while also having a predetermined edge thickness in the range of 2-3 mm, for example, to support being received by an AR or VR glasses frame.

FIG. 6 illustrates an example of a chart 600 of power level variations that may be fabricated with predetermined edge thicknesses, in accordance with aspects of the disclosure. Chart 600 demonstrates power layers (e.g., in a lens assembly) that may be used to provide various negative (or positive) optical powers by adding (e.g., 3D printing) or subtracting (e.g., Rx surfacing) optical power from lens bulks having predetermined optical powers, according to an embodiment. Lens bulks may be fabricated from a lens puck having a prefabricated power level. For example, a lens bulk may begin with a lens puck having an initial power level of −2.00 D, −4.00 D, or −6.00 D. These predetermined lens pucks may have power levels that are defined by, for example, a Fresnel structure or a GRIN structure, as disclosed above. The lens pucks may then be Rx surfaced or 3D printed upon to add optical power in the range of +2.00 to −1.00 D or +1.75 to −1.00, as an example, to provide final lens bulks with various custom power levels. The lens bulks may have these various power levels while also having a predetermined edge thickness in the range of, for example, 2-3 mm to support being received by an AR or VR glasses frame.

Figure 7:
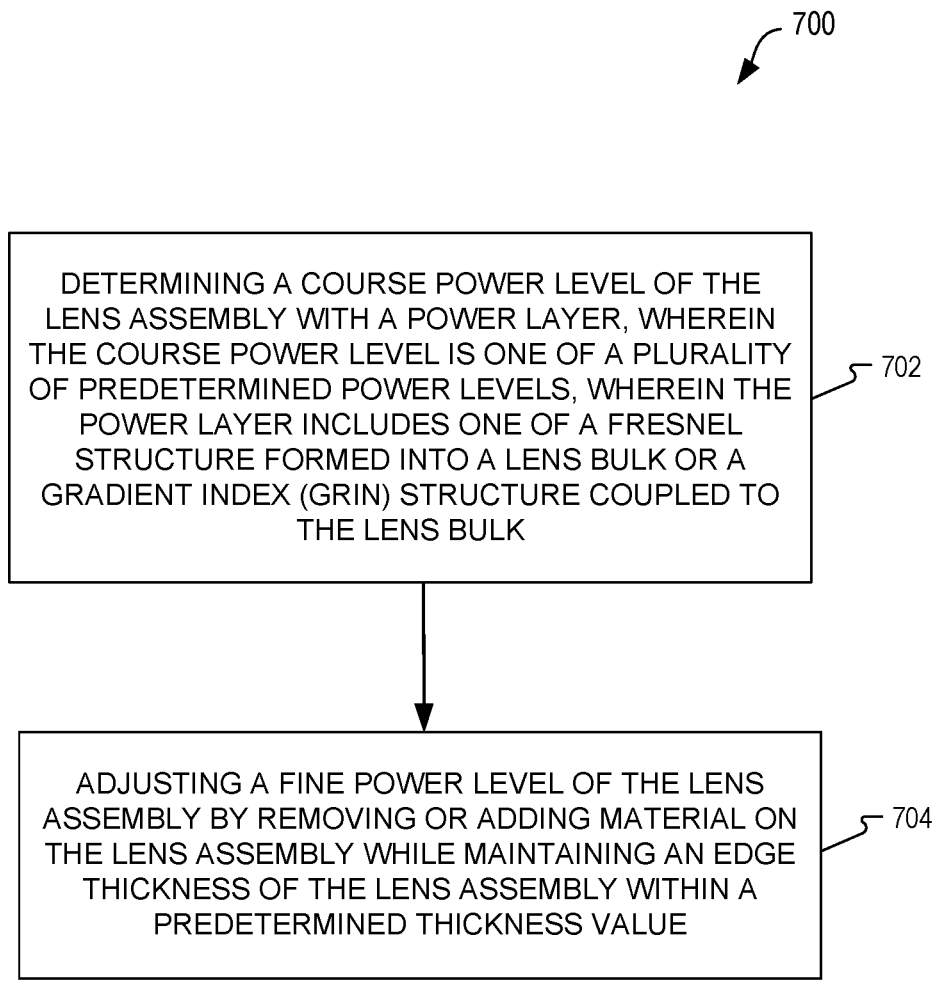
FIG. 7 illustrates a flow diagram of a process for manufacturing a lens assembly for augmented reality (AR) glasses, in accordance with aspects of the disclosure.

FIG. 7 illustrates a process 700 for manufacturing a lens assembly for AR glasses, according to an embodiment. Process 700 may be at least partially incorporated into one or more processors of, for example, optics fabrication equipment. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel.

At process block 702, process 700 determines a course power level of the lens assembly with a power layer, wherein the course power level is one of a plurality of predetermined power levels, wherein the power layer includes one of a Fresnel structure formed into a lens bulk or a gradient index (GRIN) structure coupled to the lens bulk, according to an embodiment. Process block 702 may proceed to process block 704, according to an embodiment.

At process block 704, process 700 adjusts a fine power level of the lens assembly by removing or adding material on the lens assembly while maintaining an edge thickness of the lens assembly within a predetermined thickness value, according to an embodiment.

Process 700 may include lens centration, according to an embodiment. To align the optical center of the lens assembly with a user's pupil, the edge of the lens bulk or puck may be cut or ground off, according to an embodiment. This may enable a user's pupil to be co-located with the optical center of the lens assembly while the lens assembly is carried by the frame of AR or VR glasses.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g., 120) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" (e.g., 122) described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A network may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, short-range wireless protocols, SPI (Serial Peripheral Interface), I²C (Inter-Integrated Circuit), USB (Universal Serial Port), CAN (Controller Area Network), cellular data protocols (e.g., 3G, 4G, LTE, 5G), optical communication networks, Internet Service Providers (ISPs), a peer-to-peer network, a Local Area Network (LAN), a Wide Area Network (WAN), a public network (e.g., "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described.

Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A head-mounted device comprising:
   a frame; and
   a lens assembly configured to be carried by the frame, wherein the lens assembly includes:
      a lens bulk;
      an edge thickness having a predetermined thickness value that is configured to be compatible with the frame; and
      a power layer configured to be set to one of a plurality of predetermined power levels while maintaining the edge thickness within the predetermined thickness value, wherein the power layer is configured to define a course power level of the lens assembly, wherein the predetermined thickness value includes the edge thickness of both the lens bulk and the power layer together and is an initial value set to be maintained when the power level is adjusted by physical modification of the lens bulk or the power layer and wherein the predetermined thickness value is in a range of 1.0 mm to 4 mm.

2. The head-mounted device of claim 1, wherein the power layer includes a Fresnel structure formed into the lens bulk.

3. The head-mounted device of claim 2, wherein the Fresnel structure is configured to provide the course power level as a positive optical power or a negative optical power that includes a range of −6.00 D to +6.00 D.

4. The head-mounted device of claim 2, wherein the lens bulk includes a first refractive index, wherein the power layer includes a coating over the Fresnel structure, wherein the coating includes a second refractive index that is less than or greater than the first refractive index, wherein the coating is 3D printed, cast, molded, or laminated over the Fresnel structure to provide a fine power level that adds +0.10 D to +2.00 D to the lens assembly.

5. The head-mounted device of claim 1, wherein the lens bulk includes an eye side surface that is prescription (Rx) surfaced to provide a fine power level that adds −2.00 D to +2.00 D to the lens assembly.

6. The head-mounted device of claim 1, wherein the plurality of predetermined power levels include −6.00 D, −4.00 D, −2.00 D, +2.00 D, +4.00 D, and +6.00 D.

7. The head-mounted device of claim 1, wherein the power layer includes a gradient index (GRIN) structure.

8. The head-mounted device of claim 7, wherein the GRIN structure includes a positive optical power or a negative optical power that includes a range of −6.00 D to +6.00 D.

9. The head-mounted device of claim 7, wherein the GRIN structure is coupled to the lens bulk using adhesive or heat.

10. The head-mounted device of claim 1, wherein the lens bulk includes acrylic, polycarbonate, polyurethane, polyamine, or vinyl.

11. Augmented reality (AR) glasses comprising:
    a frame; and
    a lens assembly configured to be carried by the frame, wherein the lens assembly includes:
       a lens bulk;
       an edge thickness having a predetermined thickness value that is configured to be compatible with the frame; and
       a power layer configured to be set to one of a number of predetermined power levels while maintaining the edge thickness of the lens bulk and the power layer together within the predetermined thickness value, wherein the power layer is configured to define a course power level of the lens assembly, wherein the predetermined thickness value is an initial value set to be maintained while the power level is adjusted by physical modification of the lens bulk or the power layer and the predetermined thickness value is in a range of 1.0 mm to 4 mm.

12. The AR glasses of claim 11, wherein the lens assembly further includes a display layer configured to provide user experience (UX) information towards an eyebox region of the AR glasses.

13. The AR glasses of claim 12 further comprising:
    a controller configured to determine the UX information provided by the display layer.

14. The AR glasses of claim 11, wherein the power layer includes a Fresnel structure formed into the lens bulk or includes a gradient index (GRIN) structure coupled to the lens bulk, wherein the power layer is configured to provide a course power level as a positive optical power or a negative optical power that includes a range of −6.00 D to +6.00 D.

15. The AR glasses of claim 14, wherein the power layer includes a coating over the Fresnel structure, wherein the coating is 3D printed, cast, molded, or laminated over the Fresnel structure to provide a fine power level that adds +0.10 to +2.00 D to the lens assembly.

16. The AR glasses of claim 11, wherein the lens bulk includes an eye side surface that is prescription (Rx) surfaced to provide a fine power level that adds −2.00 D to +2.00 D to the lens assembly.

17. A method of manufacturing a lens assembly for augmented reality (AR) glasses comprising:
    determining a course power level of the lens assembly with a power layer,
    wherein the course power level is one of a plurality of predetermined power levels, wherein the power layer includes one of a Fresnel structure formed into a lens bulk or a gradient index (GRIN) structure coupled to the lens bulk; and adjusting a fine power level of the lens assembly by removing or adding material on the lens assembly while maintaining an initial edge thickness of the lens bulk and the power layer together of the lens assembly and wherein the initial edge thickness is set within a predetermined thickness value.

18. The method of claim 17, wherein removing the material on the lens assembly includes prescription (Rx) surfacing an eye side surface of the lens bulk to decrease or increase an optical power of the lens assembly in a range of −2.00 D to +2.00 D.

19. The method of claim 17, wherein adding the material on the lens assembly includes 3D printing an eye side surface of the lens bulk or a scene side surface of the lens assembly to decrease or increase an optical power of the lens assembly in a range of −2.00 D to +2.00 D.

20. The method of claim 17 further comprising:

aligning an optical center of the lens assembly with a pupil of a user by selectively removing material from around an edge of the lens assembly, wherein the predetermined thickness value is in a range of 1.0 mm to 4 mm.

* * * * *